Jan. 23, 1945.                 J. KAMIENSKI                        2,367,872
                        READING AID FOR SCALED IMPLEMENTS
                              Filed Feb. 24, 1944
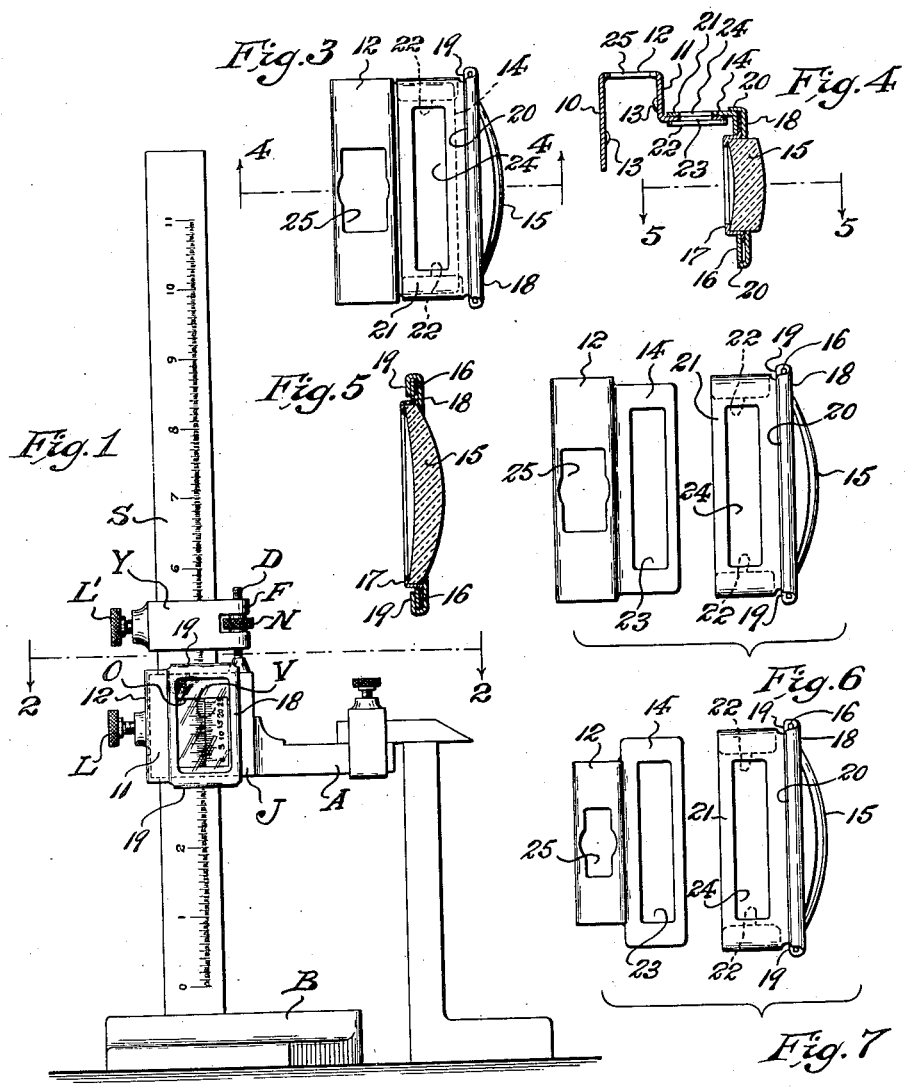
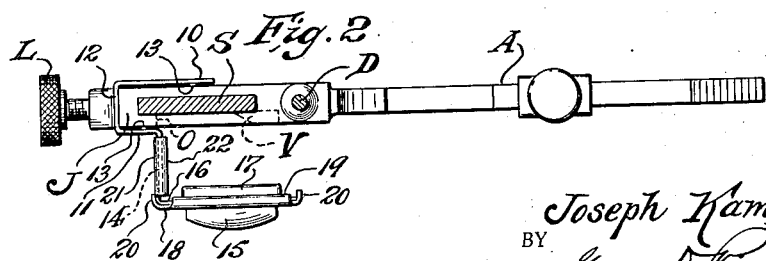
INVENTOR.
Joseph Kamienski,
BY George D. Richards,
                ATTORNEY.

Patented Jan. 23, 1945

2,367,872

UNITED STATES PATENT OFFICE 2,367,872

READING AID FOR SCALED IMPLEMENTS

Joseph Kamienski, Glen Ridge, N. J.

Application February 24, 1944, Serial No. 523,723

5 Claims. (Cl. 88—39)

This invention relates to improvements in means to aid the reading of scale graduated measuring implements and tools, and especially the reading of vernier tools such as height gages, calipers and similar tools.

The invention has for an object to provide a novel attachment including a magnifying glass adapted to be mounted on the movable jaw of a measuring tool, such e. g. as a vernier height gage, vernier caliper or the like, whereby to hold the magnifying glass in juxtaposed spaced relation to the vernier slide of the jaw, and so connected with said jaw as to accompany adjusting movements thereof, and of the vernier slide carried thereby, relative to the main scale member of the tool, to the end that reading of measurements by the user of the tool, as determined by adjustment of its movable jaw, is facilitated by magnification of the vernier and main scales, so that risk of misreading and consequent error is greatly reduced, and eye strain eliminated.

The invention has for a further object to provide a novel attachment for the purposes stated comprising a resilient clip portion to embrace and frictionally engage the movable jaw of the tool to be served, said clip portion including an angular bracket extension, and a frame member dependent from the latter by which a magnifying glass is held in outwardly spaced juxtaposed relation to the vernier slide carried by the jaw, and so as to bring within the focus of said glass the graduations of the vernier and main scales of the tool; said clip portion having an aperture in the bight thereof through which the locking or set screw of the tool jaw projects for accessible manipulation by the tool user.

Another object of the invention is to provide the glass frame off-setting bracket of the attachment with aperture means for admitting access of light to the scale graduations which underlie the magnifying glass.

A still further object of the invention is to provide an attachment for the purposes stated wherein the clip portion and its bracket extension and the glass supporting frame member comprise separable parts, and wherein the said frame member is provided with an angular extension adapted to telescopically engage the bracket extension of the clip portion subject to disengagement therefrom, all whereby the glass supporting frame member may be interchangeably and selectively coupled with various sizes of clip portions which are respectively adapted to fit different sizes of tools with which the magnifying glass may be desired to serve.

Other objects of this invention, not at this time more particularly enumerated, will be understood from the following detailed description of the same.

Illustrative embodiments of the invention are shown in the accompanying drawing, in which:

Fig. 1 is an elevational view of a vernier height gage equipped with the magnifying glass supporting attachment according to this invention;

Fig. 2 is a horizontal sectional view, taken on line 2—2 in Fig. 1, but drawn on an enlarged scale.

Fig. 3 is a side elevational view of the attachment per se, as viewed from the left in Fig. 2;

Fig. 4 is a sectional view, taken on line 4—4 in Fig. 3; Fig. 5 is a sectional view, taken on line 5—5 in Fig. 4.

Fig. 6 is a side elevational view similar to that of Fig. 3, but showing glass supporting frame member detached from the clip portion of the attachment; and Fig. 7 is a similar view showing another size of clip portion adapted to fit a smaller tool, with the glass supporting frame member in detached relation thereto.

Similar characters of reference are employed in the above described views, to indicate corresponding parts.

To exemplify the construction and use of the magnifying glass supporting attachment according to this invention, the same has been shown in Figs. 1 and 2, for the purposes of illustration, as operatively applied to a vernier height gage, but without limitation as to use with this particular type of measuring tool, since it may be applied with equal advantage to any other types of measuring tools which are equipped with movable jaws or like measuring elements adjustably related to main scale bars thereof, such e. g. as vernier calipers and similar measuring implements.

The exemplifying measuring tool in the form of a height gage as shown in Figs. 1 and 2 of the drawing comprises a base B having a suitably graduated main scale bar S upstanding therefrom. Slidably movable on said main scale bar S is a movable jaw J from which extends a measuring arm means A. Said jaw J is provided, on one face side thereof, with an opening O through which the graduations of the main scale bar S are exposed, and is further provided, in threaded extension through the back thereof, with a locking or set-screw L for securing the jaw to the bar S in a given adjusted measuring relation thereto. Affixed to the jaw J, within the opening O thereof, so as to move therewith relative to the graduations of the main scale bar S, is a vernier slide V bearing vernier scale graduations for cooperation with said graduations of the main scale bar S. Height gages of the kind described usually include an anchor yoke Y which is also adjustably slidable on the main scale bar S, and which may be secured to the latter in given adjusted positions by a locking or set-screw L'. Said yoke Y is provided at one end with a bifurcated portion or fork F to embrace a rotatable adjusting nut N which is in threaded engagement with a draft screw D arranged to project from an adjacent end of the jaw J, whereby fine adjusting movements may be transmitted to the latter in the manner well known to users of such vernier height gages, calipers and similarly equipped measuring tools.

The magnifying glass supporting attachment, in an illustrative form thereof as shown, comprises a substantially U-shaped clip portion formed from resilient sheet metal to provide an outer leg member 10 and an inner leg member 11 bridged by a bight wall 12. Said leg members 10—11 are spaced apart conformably to the thickness of the movable jaw J of the height gage, whereby to embrace said jaw so that the legs frictionally grip upon opposite faces thereof.

The inner leg 11 is preferably shorter than the outer leg 10 so that, as engaging the face side of the jaw J which is provided with the opening O through which the scale graduations of the tool may be viewed, said opening O will not be closed to an extent sufficient to obscure view of said scale graduations. To improve the frictional grip of the legs 10—11 upon the jaw J, said legs may be provided with suitably spaced gripper bosses 13 disposed to project slightly from their inner faces.

Formed integrally with the inner leg member 11, to project angularly outwardly from the plane thereof, is a bracket extension 14. Connected with said bracket extension 14, so as to extend therefrom in an offset plane substantially parallel to the plane of said inner leg member 11, and thus outwardly spaced from and substantially parallel to the apertured side of the jaw J and in opposed alignment with the opening O of said jaw side, is a frame member suitably formed to hold a suitably shaped magnifying glass 15. The detail construction of said frame member is subject to more or less variation. A satisfactory illustrative construction thereof, as shown, comprises an apertured back plate 16, within the aperture of which is arranged a bezel member 17 conformably shaped to and adapted to receive and seat the magnifying glass 15. Cooperative with said back plate 16 is an apertured front plate 18, marginal portions of the aperture of which are adapted to lap marginal portions of the magnifying glass 15, whereby to retain the latter against outward displacement from the supporting bezel member 17. Said front plate 18 is provided at its ends with doubled back keeper tongues 19 disposed to engage around the ends of the back plate 16, with their free end portions overlying the rear face of the latter, thus retaining the front plate 18 against outward displacement from its assembled relation to said back plate 16. Longitudinal marginal portions of the front plate are formed to provide rearwardly projecting keeper flanges 20 to engage over longitudinal margins of said back plate 16, thus retaining said front plate against lateral sliding displacement from its assembled relation to the back plate.

The carrier frame member for the magnifying glass may be permanently or non-detachably connected with the bracket extension 14 of the clip portion, but preferably is provided with means for detachably connecting the same thereto, so that the same frame and glass may be optionally connected to various sizes of clip portions which are respectively sized to fit various sizes of measuring tools and their movable jaws, and whereby to permit adjustment of the frame supported glass toward and from a scale to be read into desired focused relation thereto. To these ends, the back plate 16 of the glass frame member is provided with a coupling extension 21 arranged to project angularly rearward from the top margin thereof. Said coupling extension 21 is provided at its respective ends with inturned downwardly spaced coupler flanges 22 which form in conjunction with the end portions of said frame back plate 16 channeled ways to receive and frictionally engage the bracket extension 14 of the clip portion when telescopically slid onto the latter.

The clip portion bracket extension 14, and, when employed, the coupling extension 21 of the glass frame member, are provided with longitudinally central openings 23 and 24. These openings provide for access of light therethrough to bear upon the scale graduations of the tool which underlie the magnifying glass, when the device is operatively assembled with the tool, thus to avoid obscuring shading of said scale graduations.

The bight wall 12 of the clip portion of the glass holding device is provided intermediate its ends with a suitably shaped aperture 25 through which may project the locking or set-screw L of the jaw J, when the device is mounted on said jaw, whereby said locking or set-screw is accessible for manipulation by the tool user.

The projecting distance of the bracket extension 14 of the clip portion of the device is so predetermined as to space the supporting magnifying glass 15 at a proper focal distance from the scale graduations of the tool to be served.

The advantage of the glass holding attachment of this invention is that it is securely supported and held at proper focal distance from the scale graduations of the tool served thereby at all times, and being self-supporting relative to the tool, the glass does not have to be manually held, consequently the user's hands are both free for manipulation and adjustment of the measuring jaw of the tool, while at the same time, the scale graduations of the tool may be viewed not only after adjustment of the measuring jaw, but also during manipulaiton of the latter. By reason of this not only is the convenience of the user served, but much time is saved in making desired measurements, while at the same time, by reason of the obtained magnification of the scale graduations, risk of mis-reading and consequent error is avoided, and eye strain is eliminated.

It is realized that some changes could be made in the above described constructions without departing from the scope of this invention as defined in the following claims. It is therefore intended that all matter contained in the foregoing description or shown in the accompanying drawing shall be interpreted as illustrative and not in a limiting sense.

I claim:

1. A reading aid for a scaled implement having a movable measuring jaw comprising a clip portion to embrace and frictionally grip said jaw, an angular bracket extension projecting from said clip portion at the apertured scale reading side of said jaw, a magnifying glass, a frame member for holding said glass, said frame member being connected with said bracket extension so as to extend therefrom in offset plane substantially parallel and in opposition to said apertured scale reading side of said jaw, and said bracket extension having an opening therein for admitting light between said jaw and glass, whereby to avoid shading of scale graduations exposed through the apertured scale reading side of said jaw.

2. A reading aid for a scaled implement having a movable measuring jaw comprising a clip portion to embrace and frictionally grip said jaw, an angular bracket extension projecting from said clip portion at the apertured scale reading side of said jaw, a magnifying glass, a frame member for holding said glass, coupling means connected with said frame member for detachably engaging the same with said bracket extension and so as to extend from the latter in offset plane substantially parallel and in opposition to said apertured scale reading side of said jaw, and said bracket extension and coupling means having registerable openings therein for admitting light between said jaw and glass, whereby to avoid shading of scale graduations exposed through the apertured scale reading side of said jaw.

3. A reading aid for a scaled implement having a movable measuring jaw provided with a lock screw at the back thereof for setting the same in adjusted measuring position comprising a U-shaped clip portion applicable over the back of said jaw to embrace and frictionally grip the same, the bight wall of said clip portion having an opening therein to admit of exterior projection therethrough of the jaw lock screw, an angular bracket extension projecting from said clip portion at the apertured scale reading side of said jaw, a magnifying glass, a frame member for holding said glass, said frame member being connected with said bracket extension so as to extend therefrom in offset plane substantially parallel and in opposition to said apertured scale reading side of said jaw, and said bracket extension having an opening therein for admitting light between said jaw and glass, whereby to avoid shading of scale graduations exposed through the apertured scale reading side of said jaw.

4. A reading aid for a scaled implement having a movable measuring jaw provided with a lock screw at the back thereof for setting the same in adjusted measuring position comprising a U-shaped clip portion applicable over the back of said jaw to embrace and frictionally grip the same, the bight wall of said clip portion having an opening therein to admit of exterior projection therethrough of the jaw lock screw, an angular bracket extension projecting from said clip portion at the apertured scale reading side of said jaw, a magnifying glass, a frame member for holding said glass, coupling means connected with said frame member for detachably engaging the same with said bracket extension and so as to extend from the latter in offset plane substantially parallel and in opposition to said apertured scale reading side of said jaw, and said bracket extension and coupling means having registerable openings therein for admitting light between said jaw and glass, whereby to avoid shading of scale graduations exposed through the apertured scale reading side of said jaw.

5. A reading aid for a scaled implement having a movable measuring jaw provided with a lock screw at the back thereof for setting the same in adjusted measuring position comprising a U-shaped clip portion applicable over the back of said jaw to embrace and frictionally grip the same, the bight wall of said clip portion having an opening therein to admit of exterior projection therethrough of the jaw lock screw, an angular bracket extension projecting from said clip portion at the apertured scale reading side of said jaw, a magnifying glass, a frame member for holding said glass, an angular coupling extension connected with said frame member, and said coupling extension and clip bracket extension having cooperative means to slidably and separably engage the frame member and its glass with the clip member for the purposes described.

JOSEPH KAMIENSKI.